(12) United States Patent
Hanchett

(10) Patent No.: US 10,684,124 B1
(45) Date of Patent: Jun. 16, 2020

(54) SCANNING AND MEASUREMENT SYSTEM FOR REPAIR OF STRUCTURES

(71) Applicant: Michael Hanchett, Edmonds, WA (US)

(72) Inventor: Michael Hanchett, Edmonds, WA (US)

( * ) Notice: Subject to any disclaimer, the term of this patent is extended or adjusted under 35 U.S.C. 154(b) by 0 days.

(21) Appl. No.: 16/036,174

(22) Filed: Jul. 16, 2018

Related U.S. Application Data

(60) Provisional application No. 62/534,851, filed on Jul. 20, 2017.

(51) Int. Cl.
| | | |
|---|---|---|
| G01B 11/24 | (2006.01) | |
| G06F 3/0481 | (2013.01) | |
| G06F 3/0482 | (2013.01) | |
| G06Q 30/02 | (2012.01) | |

(52) U.S. Cl.
CPC ............ *G01B 11/24* (2013.01); *G06F 3/0482* (2013.01); *G06F 3/04815* (2013.01); *G06Q 30/0283* (2013.01)

(58) Field of Classification Search
CPC ... G01B 11/24; G06F 3/04815; G06F 3/0482; G06Q 30/0283
USPC .................................................. 356/600–640
See application file for complete search history.

(56) References Cited

U.S. PATENT DOCUMENTS

| | | | | |
|---|---|---|---|---|
| 5,770,864 A | * | 6/1998 | Dlugos ................ | G01B 11/028 250/559.19 |
| 6,741,363 B1 | * | 5/2004 | Kaupert ................ | G01B 11/25 250/559.23 |
| 2009/0101839 A1 | * | 4/2009 | Erlbacher .......... | G02B 21/0076 250/459.1 |
| 2012/0099117 A1 | * | 4/2012 | Hanchett ............ | G01B 11/2518 356/615 |
| 2012/0262573 A1 | * | 10/2012 | Bridges ................ | G01C 15/002 348/135 |
| 2014/0078519 A1 | * | 3/2014 | Steffey .................. | G01S 7/4817 356/625 |

* cited by examiner

*Primary Examiner* — Tri T Ton
(74) *Attorney, Agent, or Firm* — Michael Tavella

(57) ABSTRACT

A scanning measurement systems for the repair of structures that includes laser base or hub assembly. The laser base assembly serves as a single rotating head emitting a pair of laser beams, and may include a device for detecting a reflected signal (if using retroreflective targets) such as an array of photo diodes, for example, and a system for transmitting this detected signal to a computer that analyzes the signals. One use of the system is to determine the amount of deformation from a manufacturer's standards of a structure such as a vehicle frame. The system provides a compact and cost-effective way to determining the deformation of various portions of the structure and a monitoring system to display real-time data as the structure is being changed (repaired). The system can be used to show a work plan for an estimate, or a detailed report of all changes made to the structure.

17 Claims, 21 Drawing Sheets

SCANNING AND MEASUREMENT SYSTEM FOR REPAIR OF STRUCTURES

CROSS REFERENCE TO RELATED APPLICATIONS

This application claims benefit of Provisional application 62/370,029 filed Aug. 2, 2016 and 62/534,851 filed Jul. 20, 2017.

STATEMENT REGARDING FEDERALLY SPONSORED RESEARCH AND DEVELOPMENT

Not Applicable

BACKGROUND OF THE INVENTION

1. Field of the Invention

This invention relates to scanning measurement systems and particularly to scanning measurement systems for the repair of structures.

2. Description of the Prior Art

In the past, vehicles such as automobiles, had structural frames on which body panels and the like were built or mounted. Repair of vehicle damage often involved straightening the frame and reshaping or replacing body panels. However, in order to meet government-imposed fuel consumption standards, uni-body construction was adopted for many vehicles.

In a uni-body vehicle, no distinct frame exists apart from the body panels; instead the panels together form a "unibody", with the result of achieving substantial weight savings. With either form of vehicle, frame or uni-body, repairs are greatly improved with regards to speed and quality, by use of a frame (and uni-body) straightening machine. However, such machines by themselves do not provide information as to the extent or degree of straightening that is needed to return a frame to its proper shape and configuration. Thus, an important part of repairing a damaged or deformed structure, such as a vehicle, is to determine precisely the degree of deformation at various points along the structure so that the appropriate corrections can be performed.

For example, in the case of a vehicle that was in an accident, the body, structures attached to the body (such as bumpers, etc.), or portions of the frame may have been bent or otherwise deformed. In order to apply the appropriate amount of corrective forces at the appropriate location(s) on the body or other portions of the vehicle, it is necessary to have a set of precise measurements that enable the determination of the amount of deformation that has occurred. This data is typically obtained by use of a scanner or scanning system that uses a combination of an illumination source and multiple "targets" to obtain precise measurements of the location and degree of deformations. As an aid in this process, vehicles currently have manufacturer-provided reference points, such as reference openings (holes), bolts and other features located at established points on the vehicles. Manufacturers also provide specifications for the correct three-dimensional spatial locations of these reference points relative to each other. Thus, if a vehicle is damaged, these reference points may be moved from their normal or "specification" positions with respect to each other. Most, if not all, vehicle frame and uni-body straightening tasks require returning the vehicle's reference points to within manufacturer specifications.

U.S. Pat. No. 5,801,834 describes a laser generating unit located beneath a vehicle and in an orientation for sweeping laser beams across the reflective surfaces of coded targets suspended from (or in a known relationship to) one or more vehicle reference points. This system utilizes two laser beams, with each beam being directed to a rotating mirror. The rotating mirrors direct the laser beams in two 120 degree arcs (front and back of the laser), with both beams being directed in a single plane. Each laser beam is reflected back to its source when it strikes the reflective stripes of the coded targets. These reflected beams are registered as "on" events (or counts) by the electronics on-board the laser measuring device.

In the system described in the '834 patent, a counter determines the number of counts (as measured by an oscillator) from zero to the edge of each reflective/non-reflective border on the targets. An associated microprocessor (or other suitable processing element) executes a set of instructions that cause the processor to receive the count information for each target and compute the angle from the center of each mirror to the center of each target. With the two angle measurements (one for each mirror and target) and the known baseline between the two mirrors, the planar (X, Y) coordinates of each reference point are computed using trigonometry. The third coordinate (Z) is calculated using Z-coordinate representative sizing of the reflective and non-reflective strips on the coded targets. The actual three-dimensional spatial coordinates of each reference point (target location) relative to a calculated point and plane are determined and displayed to a user, along with the deviation from the normal or specification value provided by the vehicle manufacturer's data. With this information, an operator may straighten the frame or uni-body, with successive measurements being taken to monitor the progress of the straightening operation and to determine when the frame or uni-body is properly straightened.

While such a conventional system can enable a user to identify regions of a frame or other structure that have been deformed, such systems do have significant disadvantages. These disadvantages include those related to the presence of "blind spots" at each end of the system; the use of two motors driving the mirrors, thereby contributing two sources of positioning error; and the angle of the mirror relative to the detectors that forms a decreasing aperture for the return light signal as it rotates to the critical angles. As the mirror rotates, it is no longer perpendicular to the laser and detection optics. This causes a foreshortening of the mirror (i. e., smaller aperture, less return signal) especially in the critical measurement areas where the angle is very acute and therefore subject to greater calculation error. Unfortunately, these locations are also where the majority of the "torque box" components are located (a "torque box" is a roughly square sheet metal box welded between the inner frame rails and the inner rocker panels, designed to tie the two together). The torque box corner points form the four points that are the bench marks for the measurement transformation. Thus, such conventional systems are subject to (or introduce) an inherent error in the process used to determine the position of a target as a result of the motion of the mirror relative to the lasers (or other illumination source) and the sensors.

Moreover, the glass enclosure that is typically used to encase the laser and optics also creates a variable distortion of the emitted beam that is dependent on the angle of the beam through the glass. This distortion must be corrected mathematically. In some conventional systems, there are two panels of glass (front and back) that form an enclosure for the system optics. As the laser (and the return signal) pass through this glass the beam is refracted through the glass. Since the beam(s) change their angles as they move through the glass the angle of incidence also changes. This creates a varying source of error, which must be corrected; with the magnitude of the error also being dependent upon the parameters chosen for processing the signal (such as the sampling rate).

In this regard, note that there are several factors that can contribute to a pointing error during the operation of a laser. A conventional system relies on a stable mechanical structure and a fixed relationship between its structural elements. Once calibrated, its calibration only remains reliable if the relationship between the mechanical elements does not change during a measurement session. As a result, measurements are prone to errors introduced as a result of even a relatively small movement of the pointing of the laser source or other movement that might cause the system to be out of calibration, which can result in a very large error and result in generating incorrect measurements.

At acute angles, the system triangulation is more sensitive to errors caused by angular instability. The accuracy of the triangulation calculation performed by a conventional system depends on the geometry of the triangles formed by the intersecting beams. When the triangles are of an acute form, they are closer to 0 degrees so a proportionate change in the acute angles will result in a greater error being introduced.

FIG. 1 is a diagram illustrating a conventional scanning and measurement system as prior art. As shown in the figure, a conventional system will typically include illumination sources 102, one or more targets (of different types) 104, one or more sensors 103 (the photodetector elements in 102), and a data processing platform 106.

Some systems may vary this basic system design by using a different number or type of illumination source (e. g., one or two lasers). Note, however that a conventional single laser system is not capable of using the spacing/timing between the beam strikes as a method of distance detection since it only has one beam. Instead, a conventional single laser system relies on the known structure of a passive/reflective target to determine distance. Further, it can only make this determination reliably if the face angle of the target can be calculated. For a similar reason, even a single laser system used with an active target would have this potential source of error (although the use of an active target does introduce a different set of data processing capabilities, which typically depend upon the target type and the characteristics of the received signals). For example, a conventional system may include the following limitations: two independent, rotating lasers, which introduces two sources of positioning related errors; the ability to function with one style of target (either passive or active); a limited scanning area (i. e., less than 360 degrees), with the introduction of blind spots; calibration errors; potential target blockage; and use of a dual axis tilt sensor that requires that the tilt of the scanner and the tilt of the frame be accurately compensated for in software during signal processing.

Moreover, in a conventional system, there is no mechanism that allows a distance to be calculated accurately and reliably because of the differing face angle of the target to each of the spaced lasers. This causes a target's apparent width to be foreshortened; as a result, when using the width dimension of the target as a known dimension, the target appears to be further away from the laser than it actually is.

Thus, as noted, such conventional systems suffer from one or more disadvantages related to complexity, introduced calibration or alignment errors, heat or operationally induced changes to the alignment of components, or additional data processing requirements. Further, conventional systems have typically been cabled to the host computer for both power and signal transfer, which places limits on the convenience and arrangement of the system components. In addition, the passive targets used by conventional systems each have a unique code and height that can only be used in limited locations; this results in the necessity of using a greater number of targets, each with independent address codes.

BRIEF DESCRIPTION OF THE INVENTION

The instant invention overcomes all of these difficulties. The present invention is an apparatus and method for determining deformation in vehicle frames and the like, using a laser scanning apparatus in conjunction with a plurality of targets suspended from (or in known relationship to) known reference points on a vehicle or other structure. The invention is used to calculate the three-dimensional spatial coordinates of the actual positions of one or more targets, and to compare the calculated positions to manufacturer-provided specification values.

The invention includes a laser base or hub assembly, which serves as a single rotating head emitting a pair of laser beams, and may include a device for detecting a reflected signal (if using retroreflective targets (such as an array of photo diodes), for example), and a system for transmitting this detected signal to a computer that analyzes the signals to determine the amount of deformation with respect to manufacturers standards. The invention provides a compact and cost-effective system for determining the deformation of various portions of a structure, such as an automobile frame. By using a single rotating head, the invention can tolerate a greater rotational error and angular inaccuracy without it translating into a greater positioning error, because there is only one hub contributing to the error rather than two. Additionally, the single axis rotational error can be corrected during the geometric transform of the laser coordinate system.

In one embodiment of the present invention, the scanner aperture rotates with the rest of the optics. Thus, the aperture doesn't change its orientation during the 360 degrees of rotation, and, as a result, it has a constant (non-varying) capability to capture the return signal.

Other objects and advantages of the present invention will be apparent to one of ordinary skill in the art upon review of the detailed description of the present invention and the included figures.

BRIEF DESCRIPTION OF THE DRAWINGS

FIG. 14 is a representation of a screen shot of a Repair Order screen as part of the estimating system of the invention.

FIG. 18 is a representation of a screen shot of a Reports screen as part of the estimating system of the invention.

DETAILED DESCRIPTION OF THE INVENTION

Figure 1:
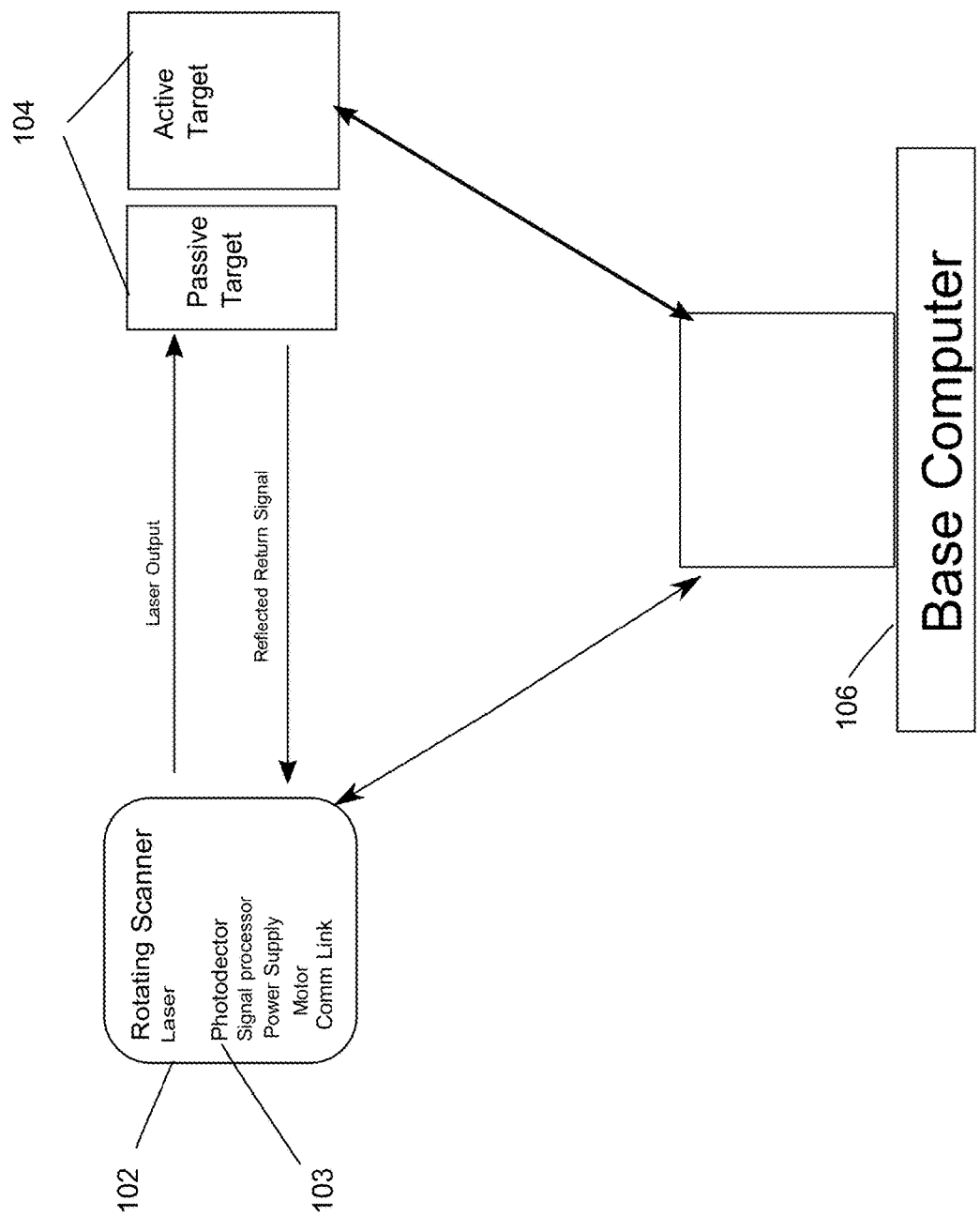
FIG. 1 is a diagram of a basic scanning system as prior art.
Figure 2:
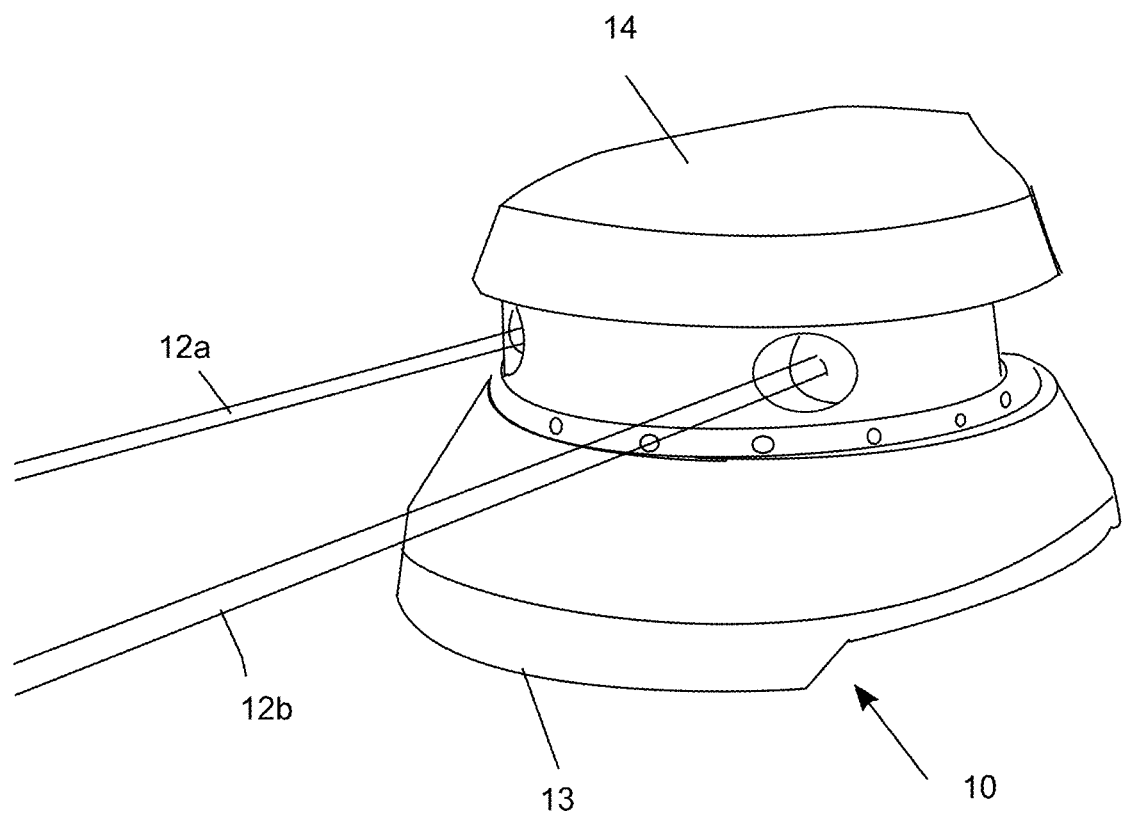
FIG. 2 is a perspective view of the two-beam scanner of the instant invention.
Figure 5:
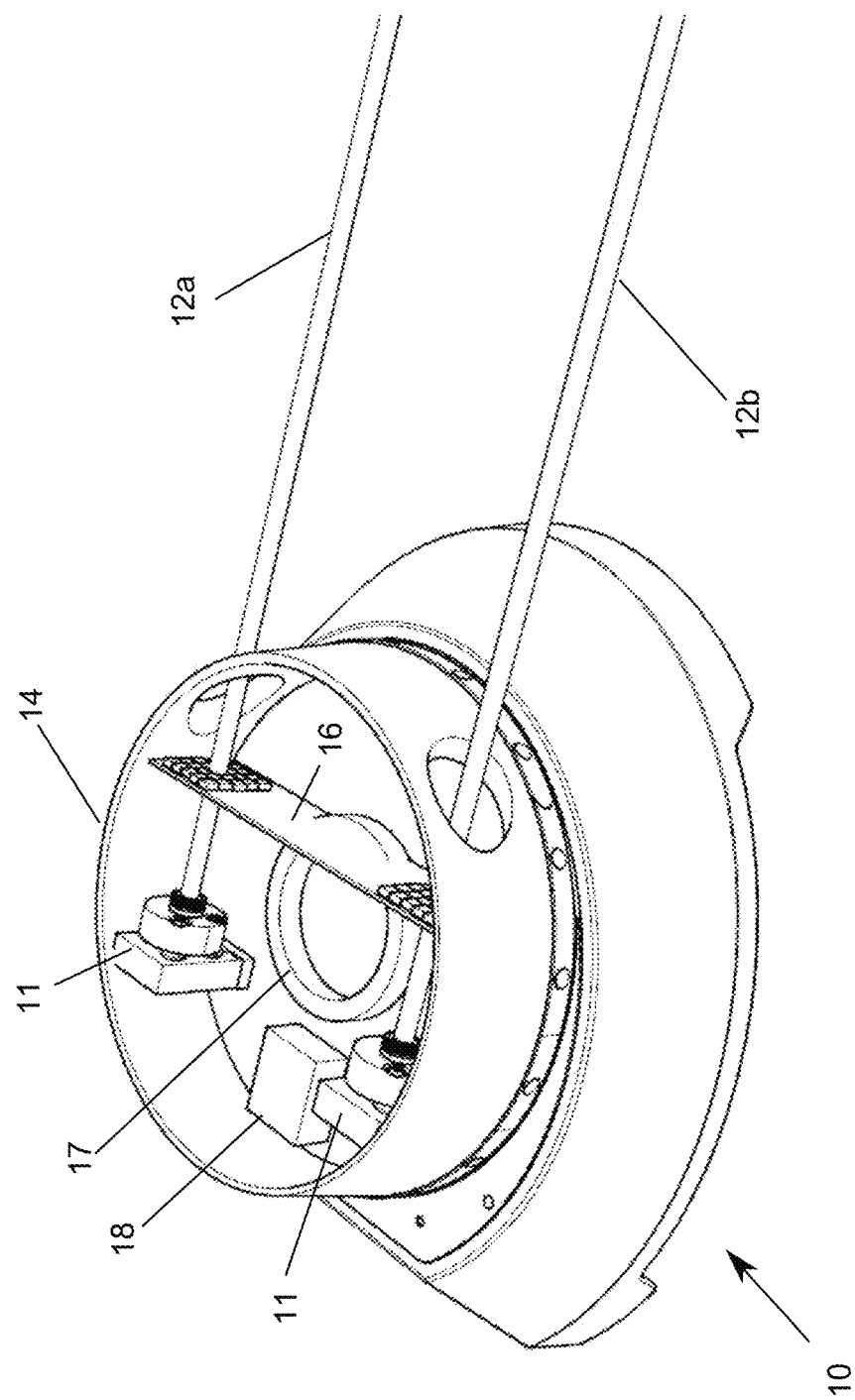
FIG. 5 is a top perspective view of the two-beam scanner showing the inner workings of a two laser embodiment having photo receptors installed.

Referring now to the accompanying drawings and especially to FIGS. 2 and 5/, a laser scanner 10 is shown. In the preferred embodiment, the scanner has a pair of emitters 11 that produce two laser beams 12a and 12b. The scanner has a base 13 and a rotating head 14. As discussed above, the single head and dual beams are more accurate that a single beam or one with multiple beams and heads. Note that the pair of emitters can be considered as a means for causing two parallel laser beams to emanate from the housing. Other such means are discussed below. Note, too that two laser beams emanate from the housing in a horizontal plane and at a known, spaced apart, distance. As discussed below, this arrangement is critical in the ability of the scanner to resolve the scanner readings into polar coordinates.

Figure 3:
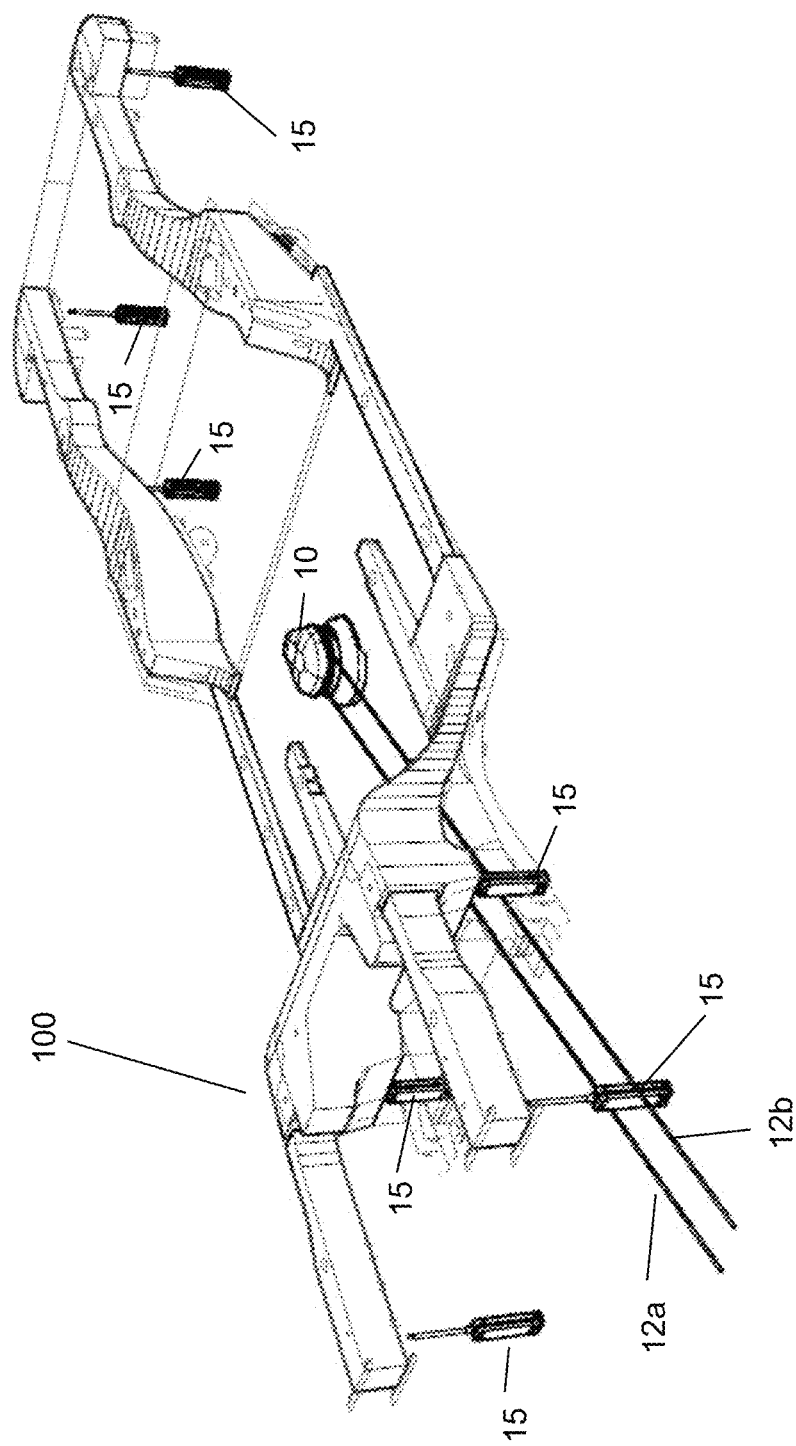
FIG. 3 is a perspective view of a vehicle frame showing the scanner of the instant invention and a number of reference targets in position about the frame.

FIG. 3 is a perspective view of a vehicle frame 100 showing the scanner 10 and a number of reference targets 15 in position about the frame. These targets are positioned at points that have been mapped by the original manufacturer. Thus, by scanning these targets, the goal is to see how much deviation from the known manufacturer's original positions for these points exists. As shown in FIG. 3, the targets 15 are read by the scanner 10 as the head 14 rotates through 360°. Note too, that the smaller size of the rotating head provides a better line of sight to targets placed under a vehicle 100 which eliminates target blockage along the frame rails.

Figure 4A:
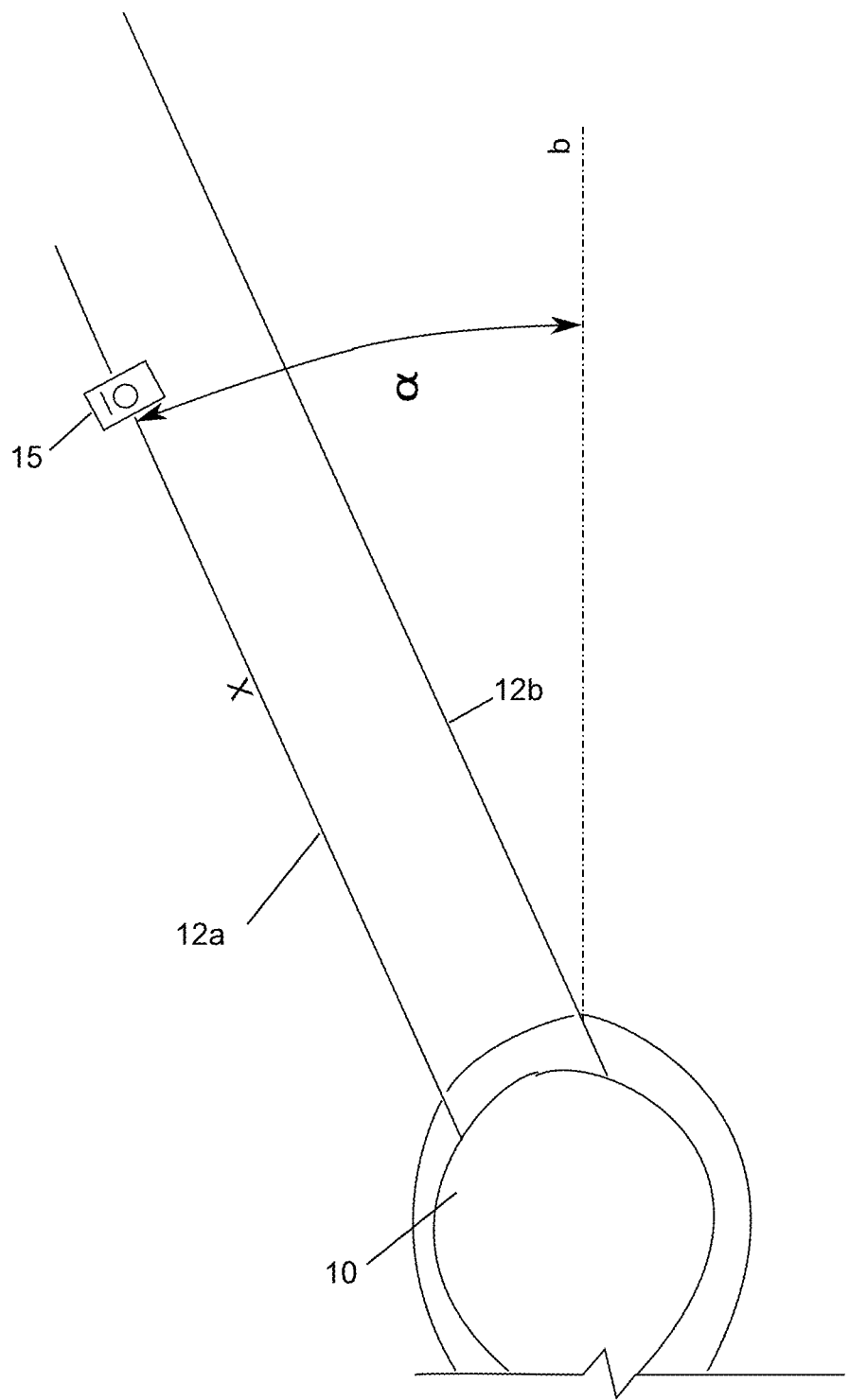
FIG. 4a is a top view of a two-beam scanner showing the first beam measuring a target at a distance of x and an angle α.
Figure 4B:
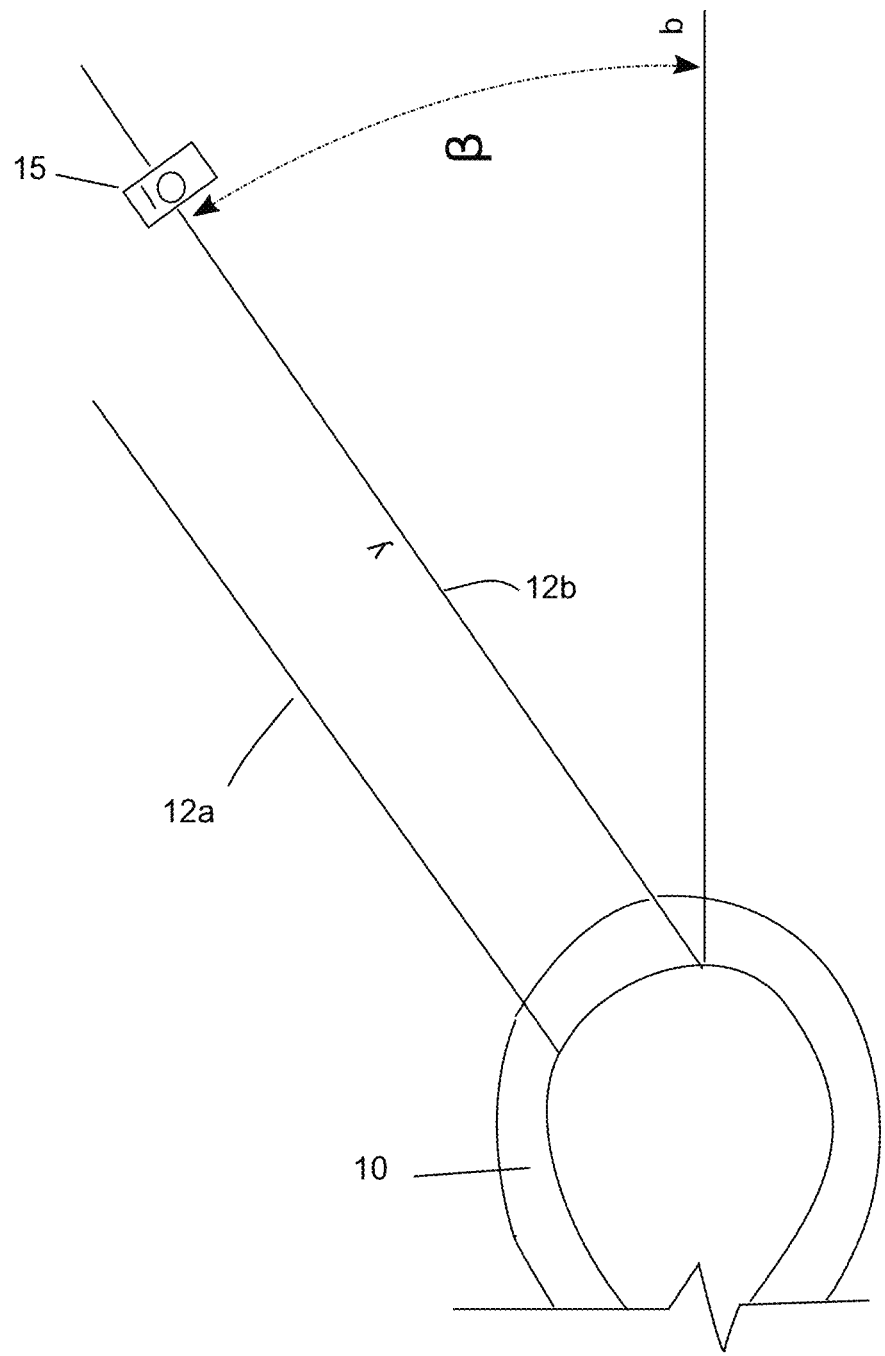
FIG. 4b is a top view of a two-beam scanner showing the second beam measuring a target at a distance of y and an angle β.

Unlike prior art scanners, which can be used only with active or passive targets, the scanner 10 can be used with active (electronic targets) as well as passive (retroreflective) targets (note the specific targets are discussed in more detail below). This is possible because the scanner generates a synch pulse to the active target(s) and the pair of beams 12a and 12b, rotating at a known distance apart, allows polar coordinates to be determined for the target location (with respect to the scanner). This is illustrated in FIGS. 4a and 4b. FIG. 4a is a top view of a two-beam scanner 10 showing the first beam 12a measuring a target 15 at a distance of x and an angle $\alpha$ (with respect to a base line b as shown). FIG. 4b is a top view of a two-beam scanner showing the second beam 12b measuring a target at a distance of y and an angle $\beta$ (again with respect to a base line b as shown).

Figure 4C:
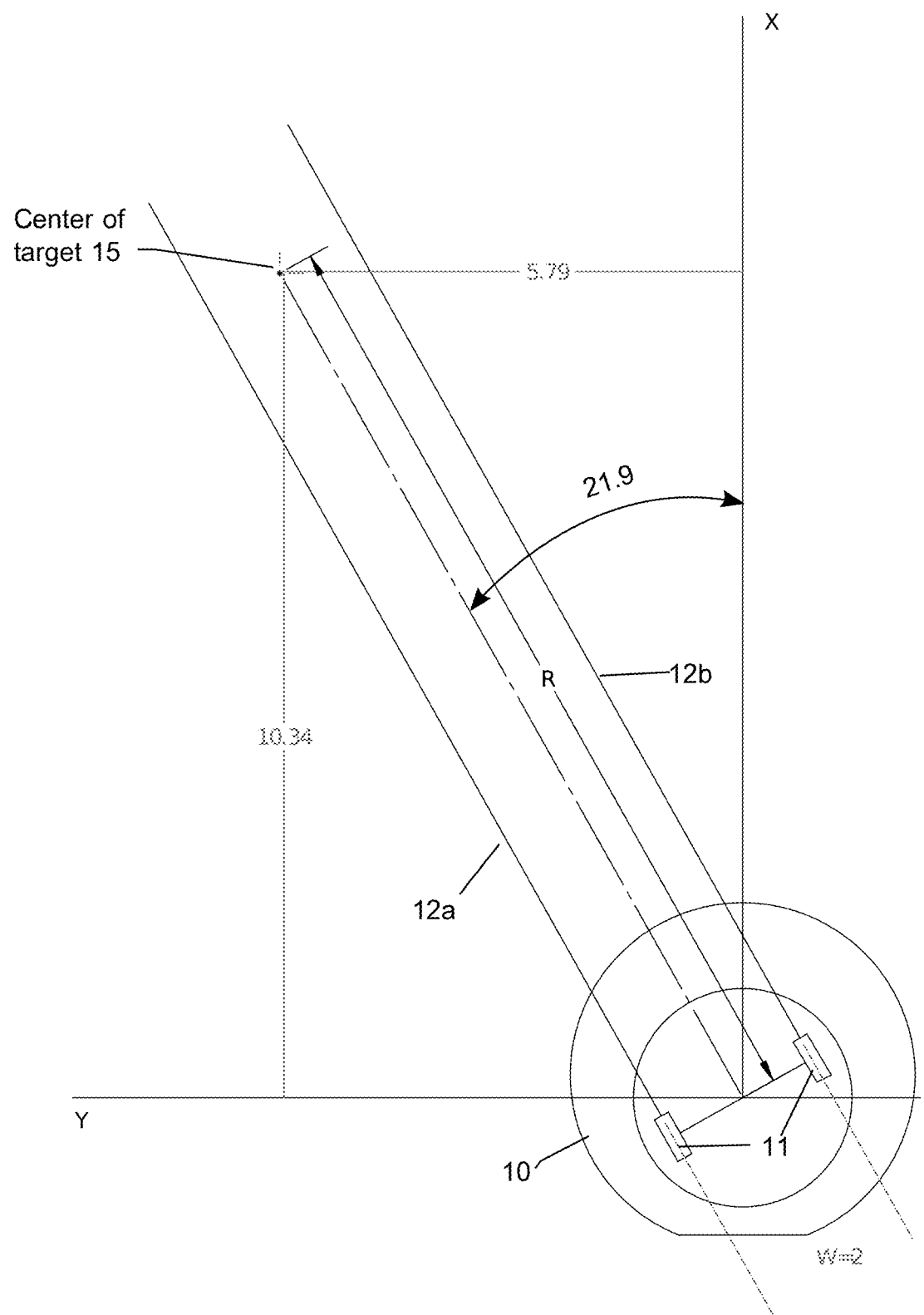
FIG. 4c is a top view of a two-beam scanner showing an average angle to a target at an average distance R and having that distance resolved into x and y components.

The ability of the system to generate polar coordinates provide a more consistent and accurate measurement of the location and orientation of a target. Inasmuch as the width between the two emitter laser beams is known, when the first laser beam passes the face of the target, it captures the leading and trailing edge of the target. From these two detection points the center of the target can be calculated. The process is repeated for the second beam. This effectively allows the system to calculate the target location from a single point on the target, irrespective of the face angle of the target to the illumination sources. The total time between the two laser strikes can be calculated and the distance thereby computed. This approach allows the face angle of the target to be calculated in standard polar coordinates of angle and distance, which effectively eliminates any foreshortening problem in the position of the target. FIG. 4c is a top view of a two-beam scanner showing an average angle $\gamma$ to a target at an average distance R and having that distance resolved into x and y components. This view shows the resolution of the two beams into that one point. The equations for resolving the x and y components are discussed below.

As discussed below, the system has two main pieces: a hardware component and a software component. The software component is discussed below. The hardware components consists of a scanner and at least one target.

Referring now to FIG. 5, a top perspective view of the two-beam scanner showing the inner workings of a two laser embodiment having photo receptors installed is shown.

Figure 5A:
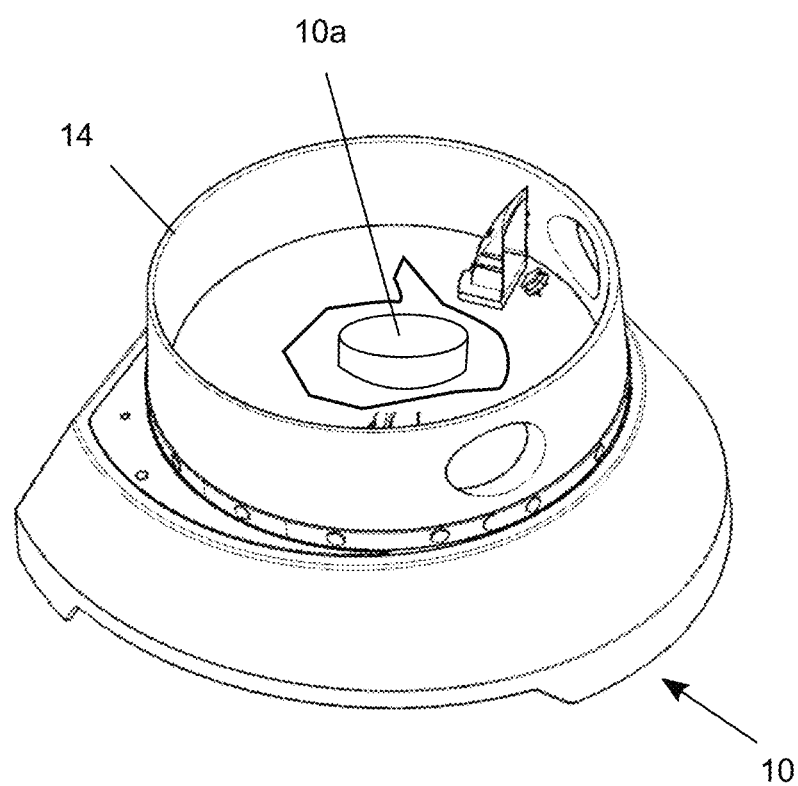
FIG. 5a is a top perspective view of the two-beam scanner showing a cutaway of the interior to reveal a motor under the scanner compartment for rotating the scanner.

In the preferred embodiment, the scanner 10 has a single rotating hub as shown. A single rotating hub only has errors associated with one motor (compared with two on many conventional systems). Moreover, the mass of a flywheel (including the hub surround, the baseplate and top plate), used in the invention, acts to stabilize the rotational stability, thereby improving the accuracy of the measurements. FIG. 5a is a top perspective view of the two-beam scanner showing a cutaway of the interior to reveal a motor 10a under the scanner compartment for rotating the scanner. This motor 10a is considered as a means for rotating the rotating head.

The preferred embodiment also has two sources of light as shown in FIG. 5. Here, two lasers 11 are installed in the rotating head 14. In this way, two relatively parallel beams 12 are emitted from the single rotating hub/head 14. The beams pass through a pair of photo receptors 16, which are used to capture return signals from active targets, as discussed below.

FIG. 5 also shows two other features found in the hub. The first is an inductor coil 17 to provide power to the head. The second is a radio/Bluetooth communication link 18 for transmitting data, These last two components are discussed in detail below.

Although two independent lasers (of almost any frequency or source of light emission that can be focused) are preferred, the two beams 12 may be created using a series of beam splitters, mirrors or prisms (including penta prisms, penta mirrors and/or rhomboid prisms). All of these devices can be considered as a means for causing two parallel laser beams to emanate from said housing. Moreover, any such similar device for producing two parallel beams can be used as well. All of these can be considered as a means for causing two parallel laser beams to emanate from said housing The use of penta prism(s)/mirror(s) helps to minimize beam drift from the initial parallel relationship/positioning. When primary beam 12*a* moves, it maintains its angular relationship with beam 12*b* as a consequence of the 90 degree properties of the optical assembly. As discussed below, this configuration can be used with any of the signal receive optics. One problem with using two independent beams is that the beams can drift independently and need to be fixed, either mechanically or corrected in software to assure accurate measurements.

Figure 6:
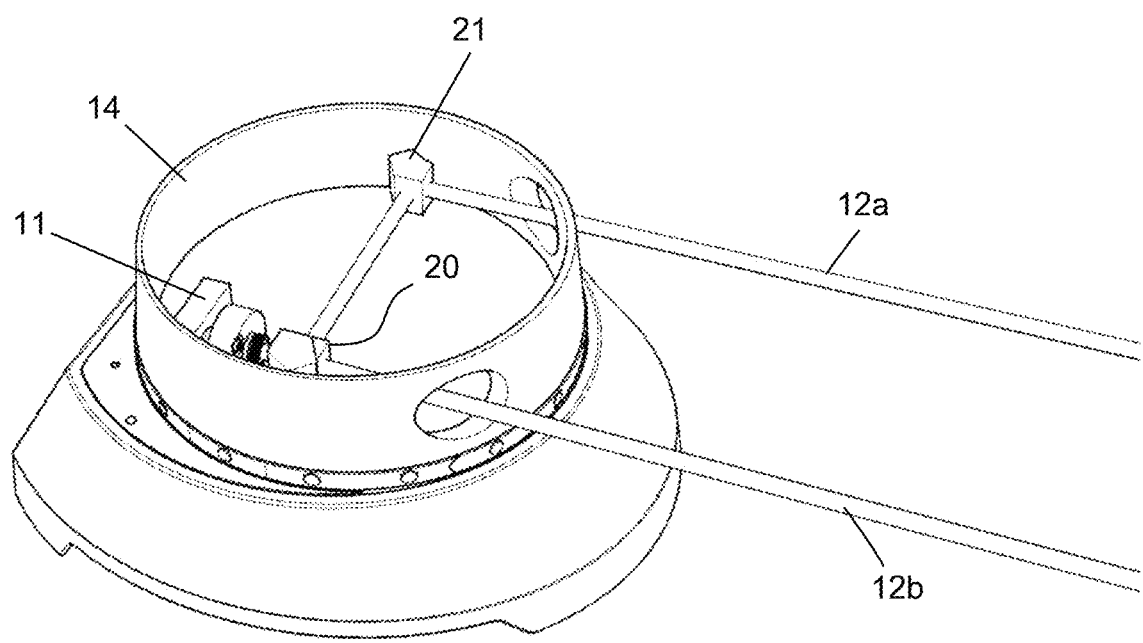
FIG. 6 is a top perspective view of the two-beam scanner showing the inner workings of a single laser embodiment having penta mirror/prism beam splitters installed.

FIG. 6 is a top perspective view of the two-beam scanner showing the inner workings of a single laser embodiment having penta mirror/prism beam splitters installed. In this view, a laser 11 positioned behind a penta mirror/prism 20. This penta mirror/prism is used to divide the single beam from the one laser 11 into two beams. Part of the first beam 12*a* is reflected orthogonally to a second penta mirror/prism 21. This second penta mirror/prism turn the light beam 90° so that this second beam 12*b* as shown.

Either a penta prism or a penta mirror can be configured to create either or both of these optical elements. A penta mirror is lighter and possibly more cost effective.

The unique property of the penta components is that they emit a 90 degree beam irrespective of beam movement or the misalignment of the optical element. This allows the beams to track each other much more precisely; and the component placement can be fixed.

This configuration can be used with any of the signal receive optics and can be used with an active or passive target systems.

Figure 7:
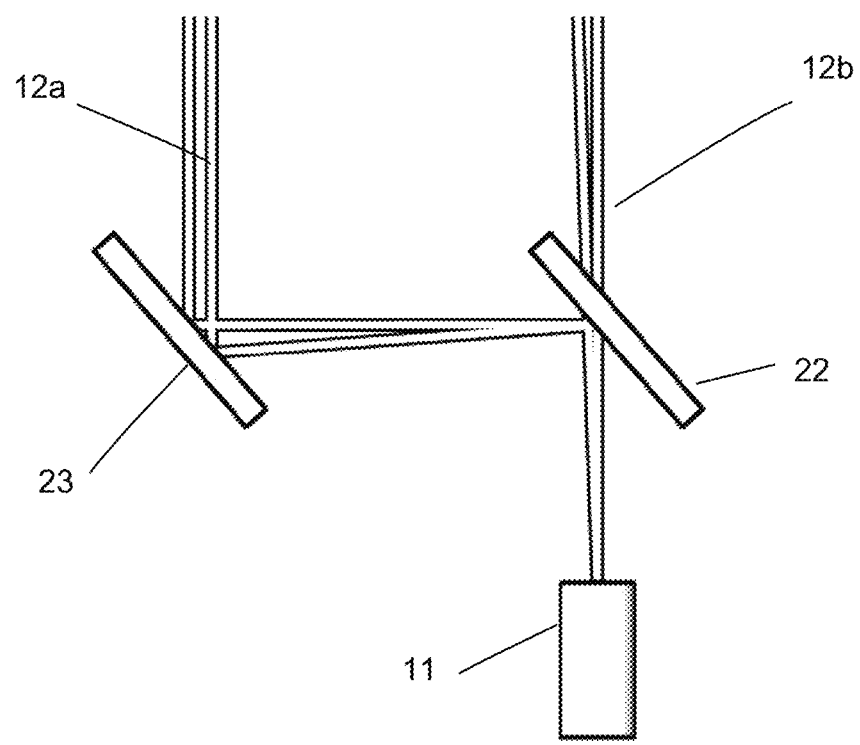
FIG. 7 is a detail view of the two-beam scanner showing a single laser embodiment having a beam splitter and a front surface mirror or installed that shows possible errors in the parallel structure of the beams.

FIG. 7 is a diagrammatic view of a two-beam scanner showing a single laser 11 and a beam splitter and a front surface mirror or prism installed. The beamsplitter 22 allows 50% of the light to pass through. It also creates a 90 degree path for the remaining light. The second beam then is reflected 90 degrees by a second mirror 23, to form the second laser beam 12*b*.

As discussed above, this system can be used with retroreflective targets. These targets, when hit by a light beam, reflect a return signal. The return optical signal from the retroreflective targets can be detected in a variety of ways.

The first method is illustrated in FIG. 5 above, where either a single or multiple photo receptors 16 are used to receive the return signal.

Figure 8:
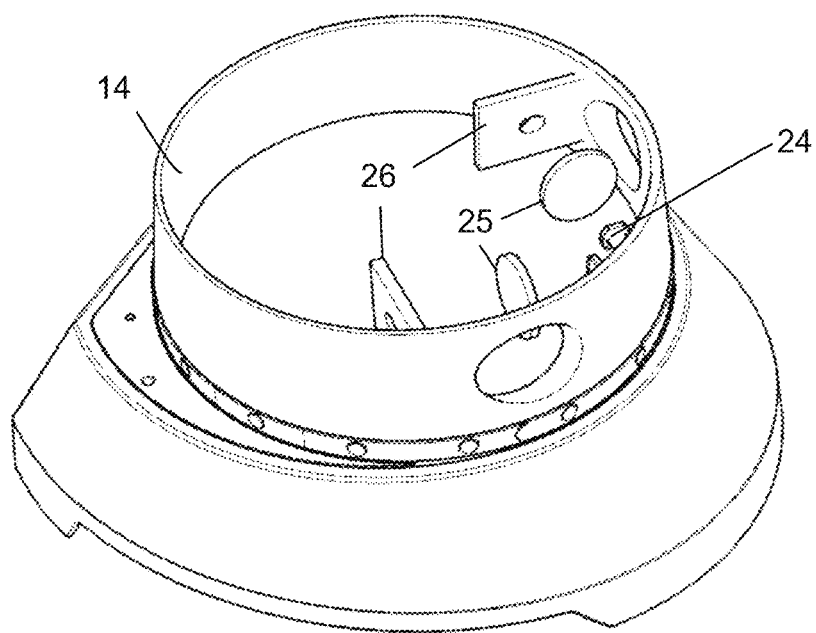
FIG. 8 is a top perspective view of the two-beam scanner showing the inner workings of photo receptors using photo diodes, Fresnel lenses and mirrors.
Figure 9:
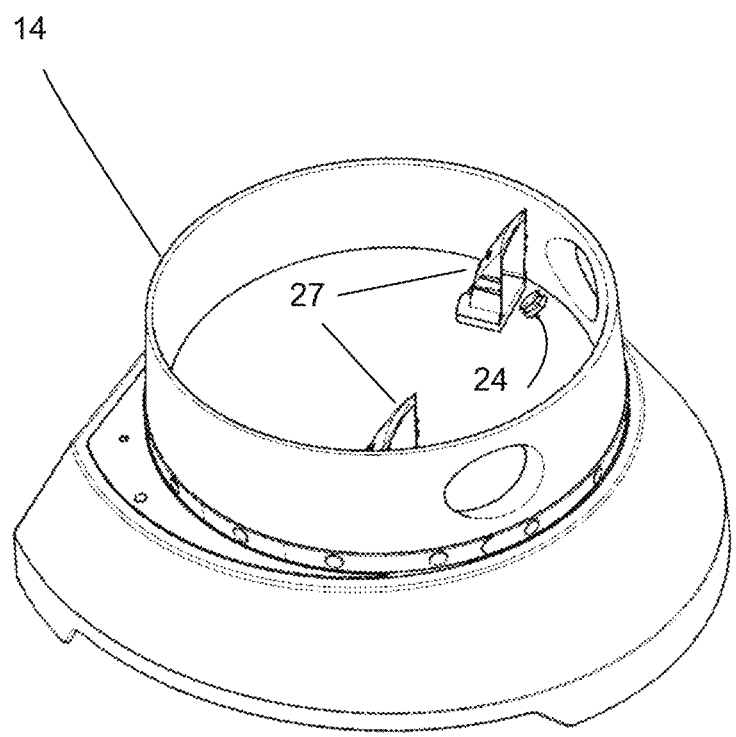
FIG. 9 is a top perspective view of the two-beam scanner showing the inner workings of photo receptors using photo diodes and parabolic reflectors.

Other methods for receiving signals from targets is shown in FIGS. 8 and 9. FIG. 8 shows a scanner head 14 showing a pair of photo receptors that use photo diodes 24, Fresnel lenses 25 and mirrors 26.

FIG. 9 is a top perspective view of the two-beam scanner head 14 having a pair of photo receptors that use photo diodes 24 and parabolic reflectors 27.

In all of these schemes, a filter (not shown) of the frequency of interest can be placed in the return path to minimize interference from other light sources.

Figure 10:
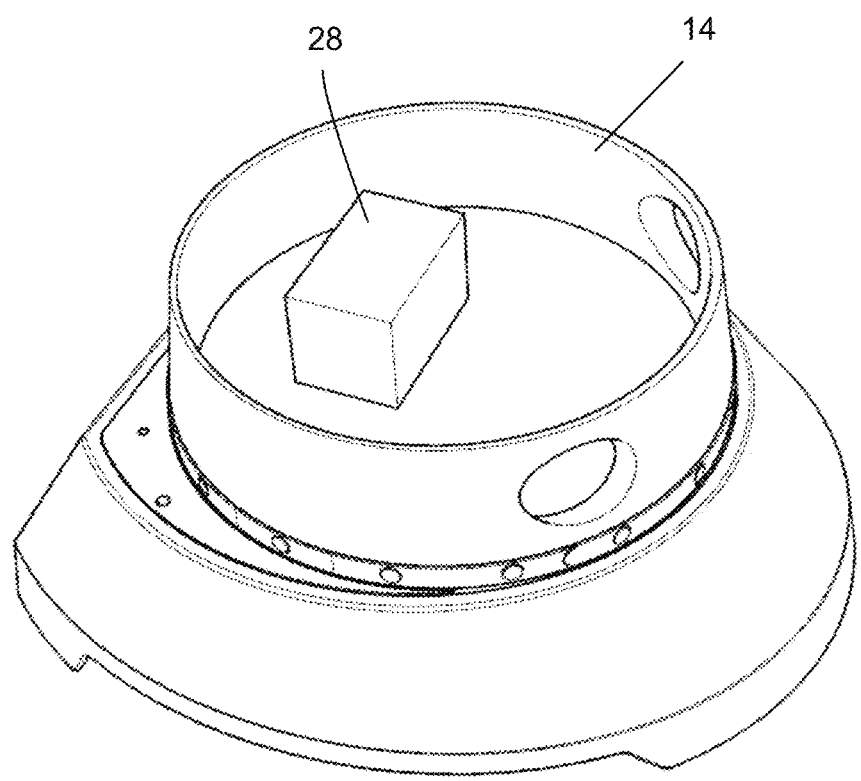
FIG. 10 is a top perspective view of the two-beam scanner showing a battery installed in the rotating hub.

FIG. 10 is a top perspective view of the two-beam scanner showing a battery 28 installed in the rotating hub. The battery is a source of power for the system, as is the slip ring 10*b* shown in FIG. 5. Either of these devices, or any others that are compatible with the system can be used to power the system.

As a consequence of having two beams, the system can calculate the distance from the rotating hub to a target using the timing of the beams in conjunction with a fixed separation of the two beams. The use of two beams crossing the target very close to each other provides an advantage as well as the increased accuracy from the overall stability of the head. Since the calculation of width is determined by the timing between the two beam strikes, there is less likelihood that the rotation speed of the hub exhibits any acceleration/deceleration in this relatively short period of time, as compared to some conventional systems in which scans can be widely separated on the rotational count comparison. Moreover, a conventional scanner using two rotating beams has two different motors with differing stability and sequential strikes that can be almost 360 degrees out of phase from each other.

Figure 11:
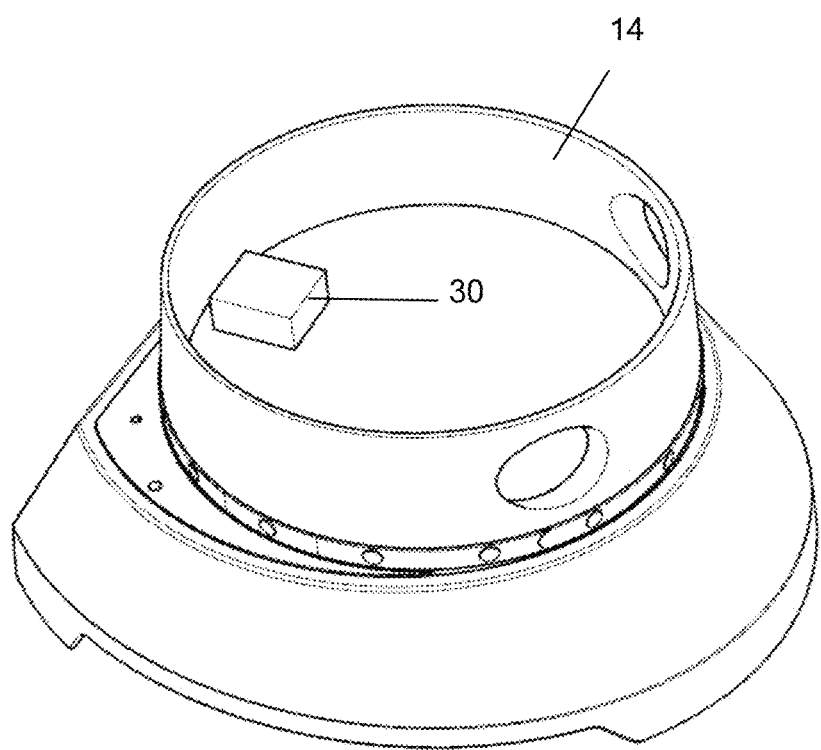
FIG. 11 is an internal view of the two beam scanner showing the internal control circuit.

FIG. 11 is an internal view of the two beam scanner showing the internal control circuit with the data storage link 30.

Figure 12:
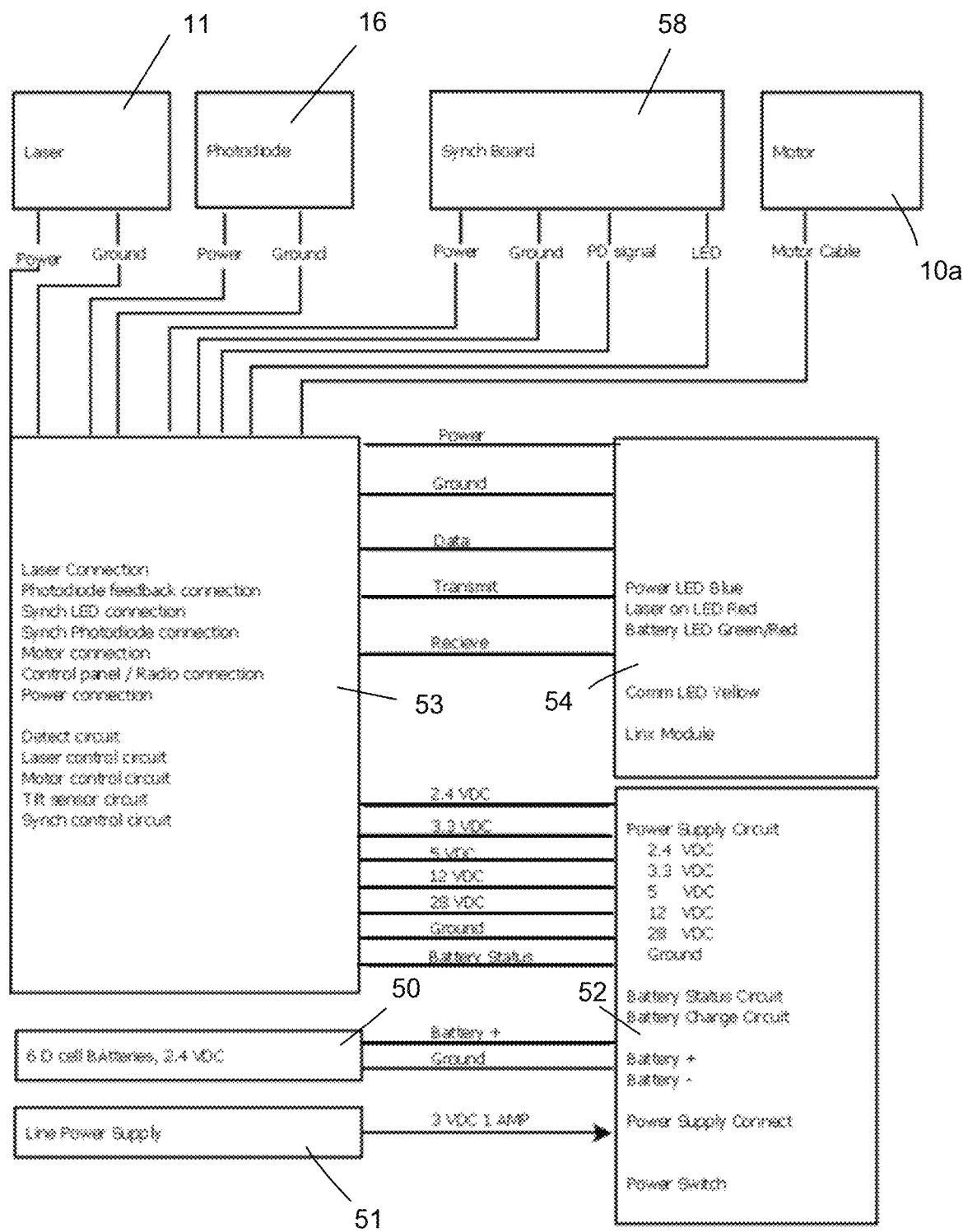
FIG. 12 is a block diagram of the internal control circuit with data storage link.

The scanner is controlled by control circuits as shown in FIG. 12, which is a block diagram of the control circuits. The bottom of the diagram shows power supplied by batteries 50 and a line source 51. These feed into a power supply module 52 that provides a range of voltages to the controller module 53. The controller module 53 supplies power to the laser(s), the photodiodes, the synch board 55, and the motor 10*a*, as shown. This module also provides power to the module 54, which sends and receives data to and from the host computer.

As shown, the control circuit produces a synch pulse using the synch board 55, which is a trigger that starts an internal clock and provides the index (start) position for the rotating head/laser(s). For passive targets, this signal is utilized internally in the signal counters. This signal is sent to the master clock of the counter and creates a high resolution encoder from which the angle of the beams can be calculated. In the case of active targets, the trigger initiates an array of a pulsed light source that is distributed in a 360-degree pattern around the scanner. The master clock of each target is triggered in the same manner, and generates a high resolution count to calculate the angular element of the target to the scanner.

Thus, the internal clock is used to create a high resolution encoder to determine the relative angle of the emitted beam(s) to the targets. This clock can operate internally to an active target or local to the laser when using a retroreflective target. FIG. 12*a* shows an array of infra red (IR) light emitting diodes (LEDs), which are used in one embodiment, b provide the master synch pulse to active targets in the field of view.

Retroreflective targets have a specific geometry that sends the reflected light directly back towards the source of light irrespective of the angle of the target to the incoming beam. This type of target is less expensive to build than an active target and can be configured in a number of ways: for example, the target pattern can be used to create an ID, provide height information, identify a 'group' of targets or create specially sized targets. Photodetectors operate as sensors to detect the return signal(s) of reflected light from a retroreflective target. The detectors, such as the photo detectors 16 of FIG. 5 of the photo diodes 24 of FIG. 9.

Figure 13:
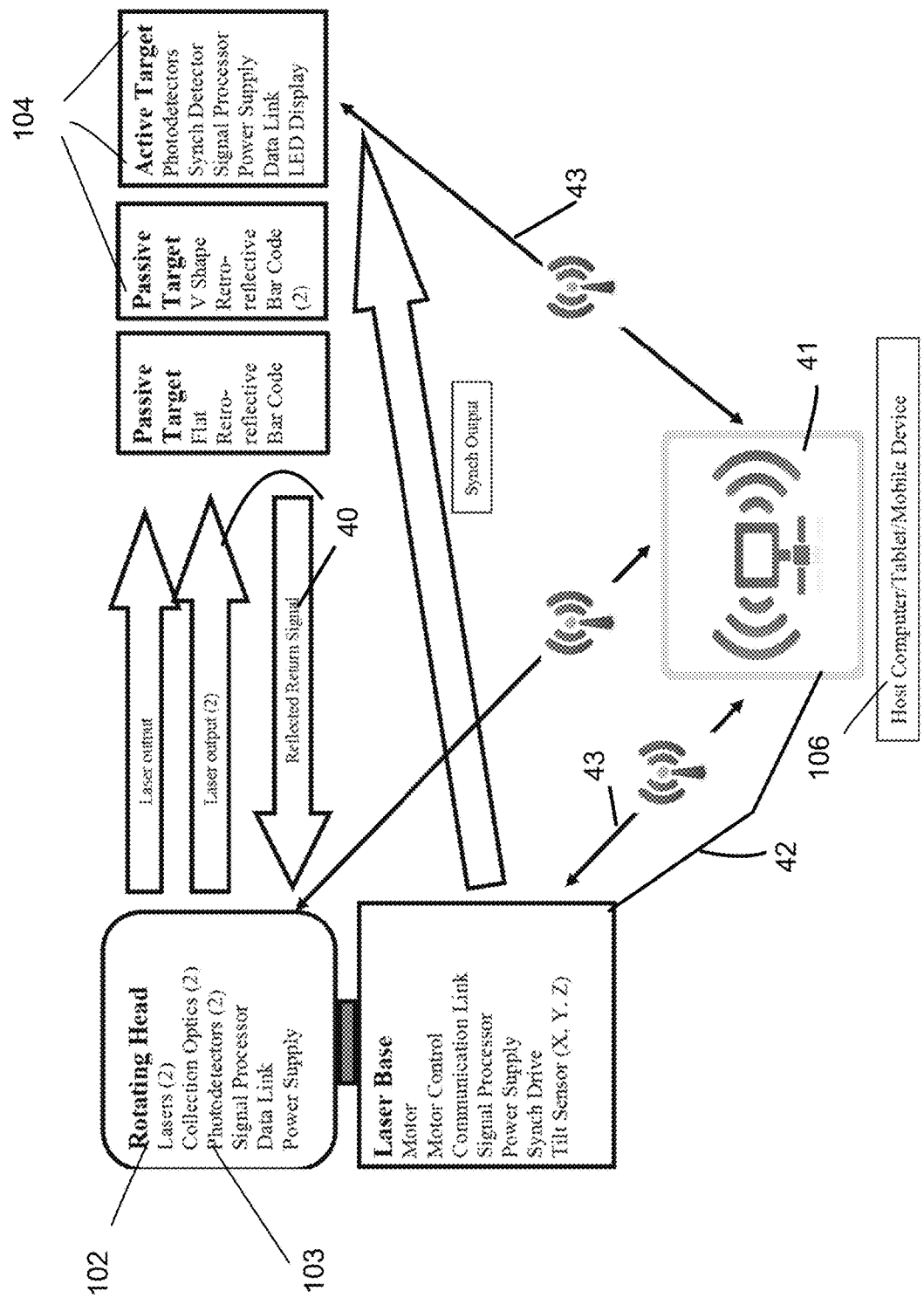
FIG. 13 is a diagram of the overall system showing the scanner active targets and passive targets and to a base computer and the flow of communications between them.

FIG. 13 is a diagram of the communications circuit from the scanner and any active targets to a computer. The raw strike data, which in one form is a series of pulses 40 is transmitted from the laser (and from the target in the case of an active target) to a host computer 41. The data is processed in the computer to generate the coordinate information used to identify the locations of the targets. The data can be in the form of a serial stream of data that provides count information and/or in the form of a numeric representation of the point in space (such as a three-dimensional description).

The data from the laser and/or targets can be transmitted in a variety of forms to the computer 41. For example, wired link 42 can be used, a wireless link 43 (radio, Bluetooth, Wi-Fi), or an optical link 44 may be used. In the preferred embodiment, the data link is a wireless Bluetooth link; this allows a relatively easy set up for the laser and eliminates the problems associated with cable damage.

The scanner heads also contain one or more tilt sensors. These allow errors caused by the tilt of the scanner and the pitch and roll of the vehicle to be determined and corrected. Since the target elements are suspended from the car on stems of varying lengths, each forms a pendulum. As the vehicle is tilted or rolled, the pendulums act as plumb bobs and continue to hang straight. This angular tilt causes the targets to appear closer to the laser (and to each other) adding an error to the measurement.

As discussed above, two types of targets can be used with the device. The first type is an active target. These targets include electronic elements for generating signals. They are also capable of detecting a synch signal and the laser sweep, and in response, transmitting position information to a host computer.

The second type is retroreflective targets, which are in a category termed "cooperative passive targets". They are designed to send a strong reflective optical signal back to the source. An example of a target of this type would be a target with symbols that resemble a bar code. The target provides a series of pulsed optical return signals as the laser scans across them. This type of target has typically been constructed to have a flat face design. If the target is arranged in a perpendicular relationship to the laser(s), then there is no foreshortening of the return signal; however, note that a perpendicular relationship to a single beam, single head laser is difficult to reliably achieve in practice and not possible with a two hub system. However, as discussed above, for the instant invention-a single hub with two beams, any foreshortening is compensated for automatically. A retroreflective V design target has been described for use with a single line scanner. It provides a geometry that allows the target face angle to be calculated and the foreshortening eliminated. One of the significant advantages of the instant invention is that it can be used with any of the described system targets.

Moreover, unlike prior art systems, the instant invention utilizes a set of targets that have multi-length detachable stems that can be used on any frame or body location by selecting the appropriate stem length and attaching it to any target. This modular approach requires fewer unique components, thereby reducing the complexity and quantity of the parts required to be available for making reliable measurements.

Each target may have a unique code, although a preferred method is for the target code to be the same on each target face. The location of the target under the subject structure determines its "address" (a term referring to a part of the "spatial addressing" used by the invention). In a prior art system, each target has a unique height and the placement of these targets is specific as they are assigned to specific measurement points under the structure. In the instant invention assigning targets is easier because any target can be used in any location. In this way, the number of components can be reduced based on the minimum number of points that need to be measured. As a result, fewer parts are needed to measure a greater number of points with less cost and confusion.

Note that with a single rotating hub, the width of the beams needs to be a fixed number to accurately calculate distance. Since lasers can drift, the beams can move away from their initially parallel relationship. In the preferred embodiment of the invention this error is corrected by dynamically adjusting the slight angular error between beams (see, e. g., FIG. 7) using software. One method to do this calculates the sum of the X, Y errors squared and solves for the lowest error sum. At this point, the rotating laser is (theoretically) contributing the least amount of error to the system as a whole. A slight increase in error caused by the scanner acts to amplify the total error being contributed by the scanner. The error calculation allows the lowest number to be defined for the scanner.

As described, the design of the invention enables it to determine an accurate distance/location/position measurement of a target based on polar coordinates. Referring again to FIGS. 4A, 4b and 4c, the average distance from the center of the axis of rotation (based on ½ of the baseline W) to a target is given by:

$$R=(W/2)/\sin((\Theta_2-\Theta_1)/2) \qquad (eq. 2)$$

where R is the distance from the center of the axis of rotation (based on of the baseline W) to the a target, W is the width of the baseline (i. e., the width of the scanner), $\theta_1$ is the angle of the first laser beam striking the target (as discussed above angle $\alpha$ in FIG. 4a), and $\theta_2$ is the angle of the second laser beam striking the target (angle $\beta$ from FIG. 4b).

The X and Y coordinates of the target are then calculated as follows:

$$X=R*\cos((\Theta_2+\Theta_1)/2) \qquad (eq. 3)$$

and $$Y=R*\sin((\Theta_2+\Theta_1)/2) \qquad (eq. 4)$$

Thus, for example, as shown in FIGS. 4A, 4b and 4c, assuming the width of the baseline W as being 2 inches, $\Theta_e$ equals 24.46° and $\Theta_2$ equals 34.13°, R equals 11.85 (from eq. 2). Then the X and Y coordinates can be calculated as follows: the X coordinate is 10.34 (from eq. 3) and the Y coordinate is 5.79) from eq. 4). See, FIG. 4c.

Having computed the X,Y positions of the detectors/retroreflective stripe on each active target and by reading the Z height (taken from either the Photo Sensitive Detector (PSD) on an active target, or the ratio of the diagonal retroreflective stripes on a passive target), stem length and adapter offset, the system can then compute the X,Y,Z location of each stem attachment point. These calculated positions can then be corrected for the pitch and roll of the scanner and vehicle using the tilt sensor information transmitted from the scanner.

Once the data is received by the scanner, it is transmitted to the main computer. The system is designed to provided an interface for the user that consists of five primary display screens: one for initial data entry; one for set up; one for the analysis and measurement of a 3d type of display; one for displaying and indicating the frame deformation; and one for the reporting of the results of any repairs (and/or the current state of damage for a frame). These are shown in FIGS. 14-18.

The software can be run on a variety of hardware platforms, including but not limited to mobile phones, tablet computers, desktop computers, or a server platform operating "in the cloud"; for the graphic user interface, an embodiment may use "augmented graphics" where the measurement information is displayed with a graphic/image of the actual object being measured. This effectively creates a custom GUI for the vehicle under repair.

Figure 14:
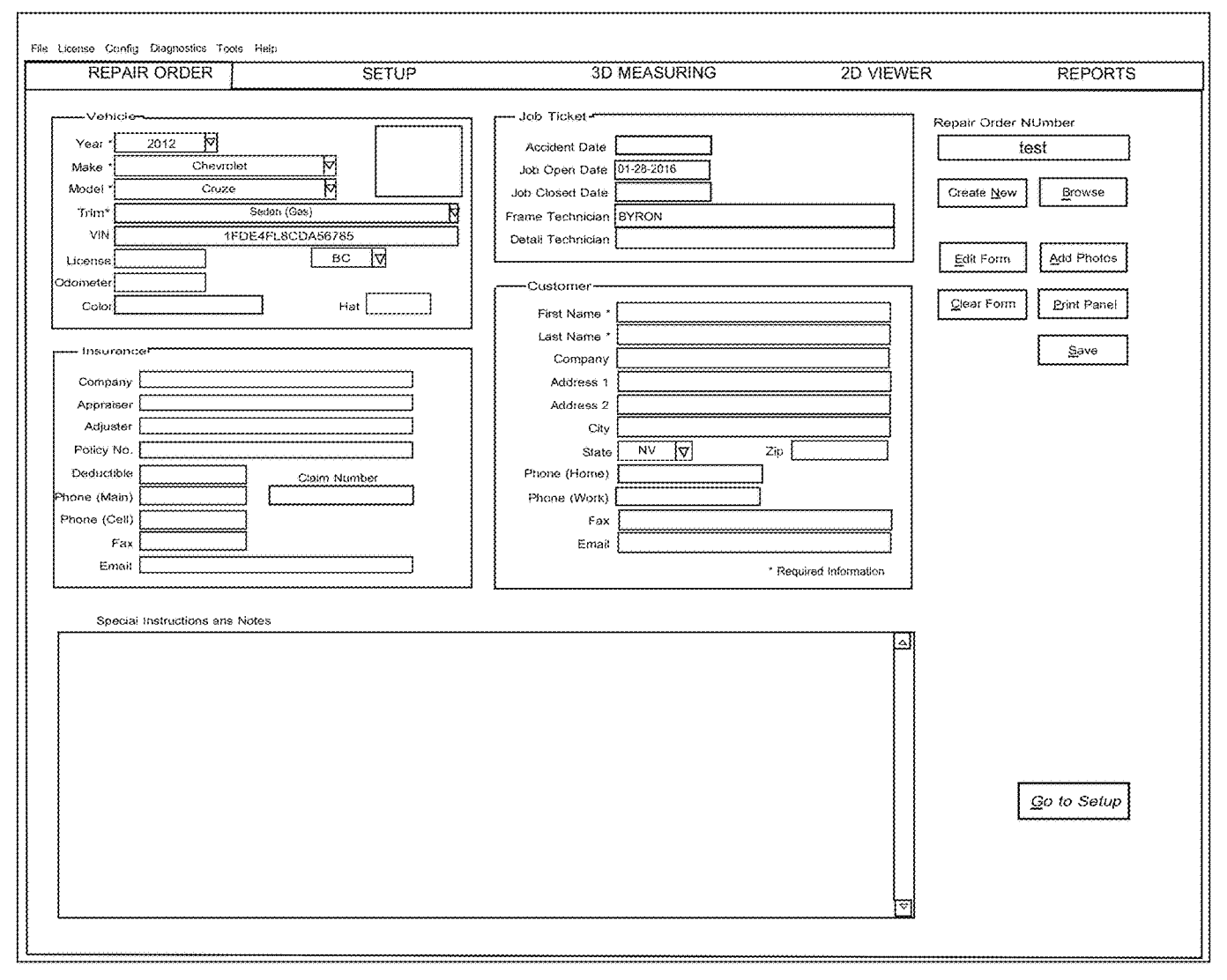

FIG. 14 is a screen shot of the initial screen called a "Repair Order" screen. The data entry function includes a set of fields for entering and editing the information regarding a given frame repair task. As shown, fields include: customer data, automobile data, insurance company data, and repair technician data. This data includes a choice of year, make, model and trim level to choose the exact car the technician is working on. The contents of these fields may be saved into a database that stores the information regarding each individual measurement and repair done by a given workstation. The data is stored in such a format that it can be transferred to other workstations, and archived for later retrieval. The data is also accessible by the other screens for uses appropriate to each screen.

Figure 15:
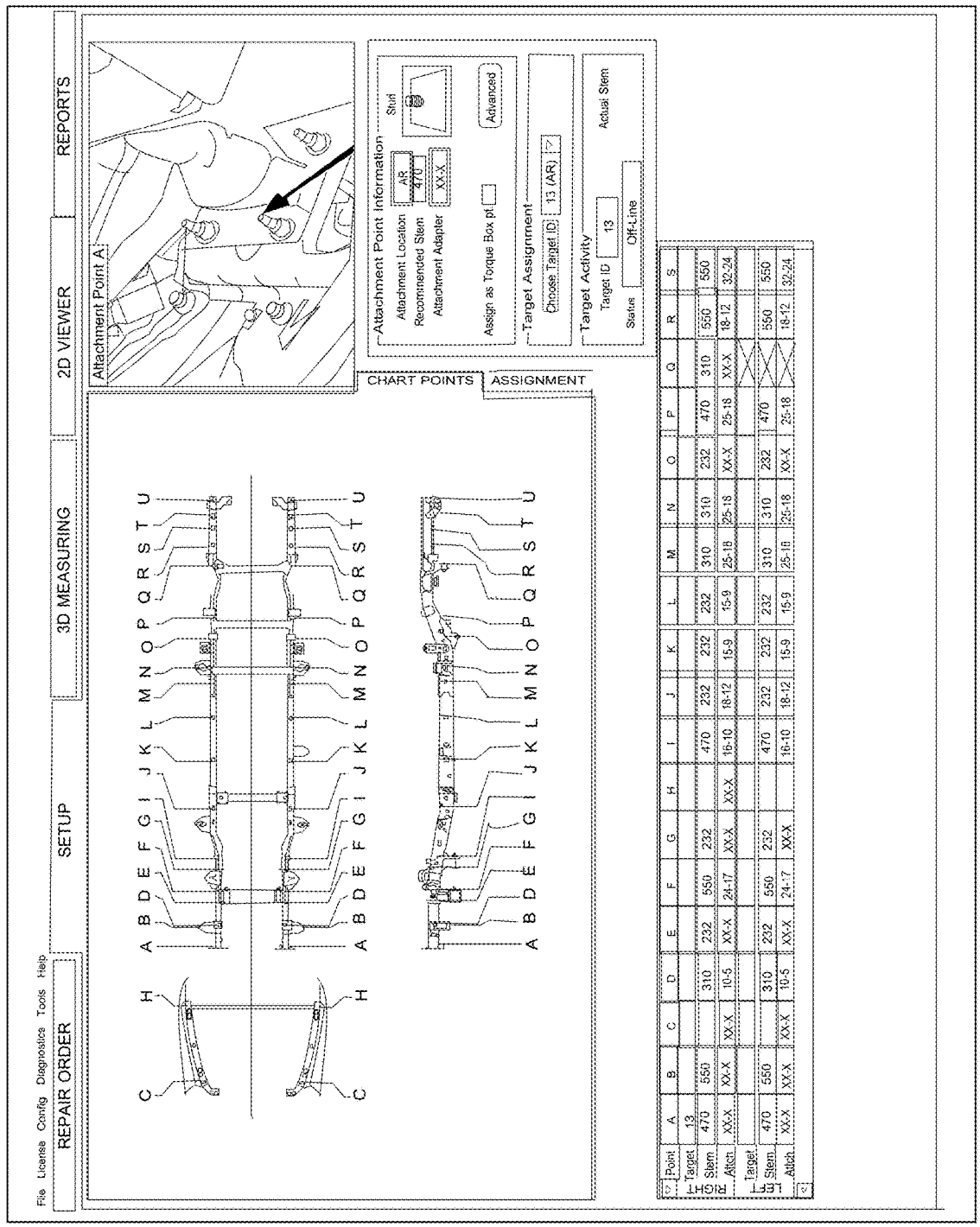
FIG. 15 is a representation of a screen shot of a Setup screen as part of the estimating system of the invention.

Next, the user turns to the setup screen, as shown in FIG. 15. This screen displays the as-built frame for the car to be analyzed and repair. It also allows the technician to select the attachment points for targets, based on damage and other factors. This screen also shows a photo of the as built frame for a selected attachment point. It also allows the technician to record the attachment point information at each desired location.

Figure 16:
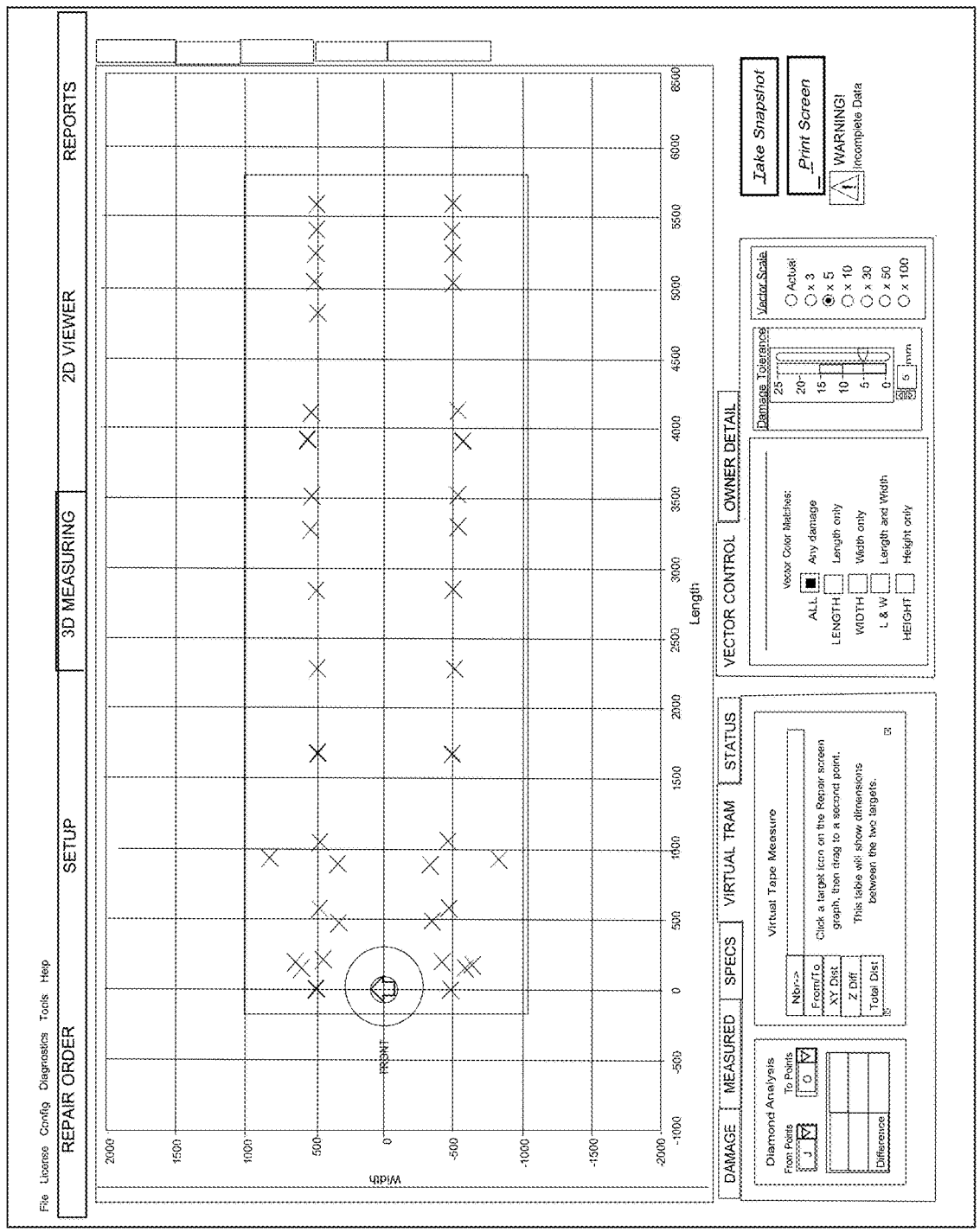
FIG. 16 is a representation of a screen shot of a 3D Measuring screen as part of the estimating system of the invention.

Next, the computer displays a set of measurements taken from the actual vehicle. This is shown in FIG. 16. Here, a mock-up frame of the car as-built is displayed by the program in a 3D graphic (the system uses the 2D frame information from the manufacturer to create a 3D model of that vehicle frame so that the user can rotate, pan and zoom in space around the frame model). This makes it easier for the user to understand the relationship between the digital model and the real car and to understand the damage to the frame. Data can also be entered manually to accommodate limited production, vintage or custom vehicles that have no readily available manufacturer specifications. It also displays details of the damage that can be used for evaluation of the vehicle.

Figure 17:
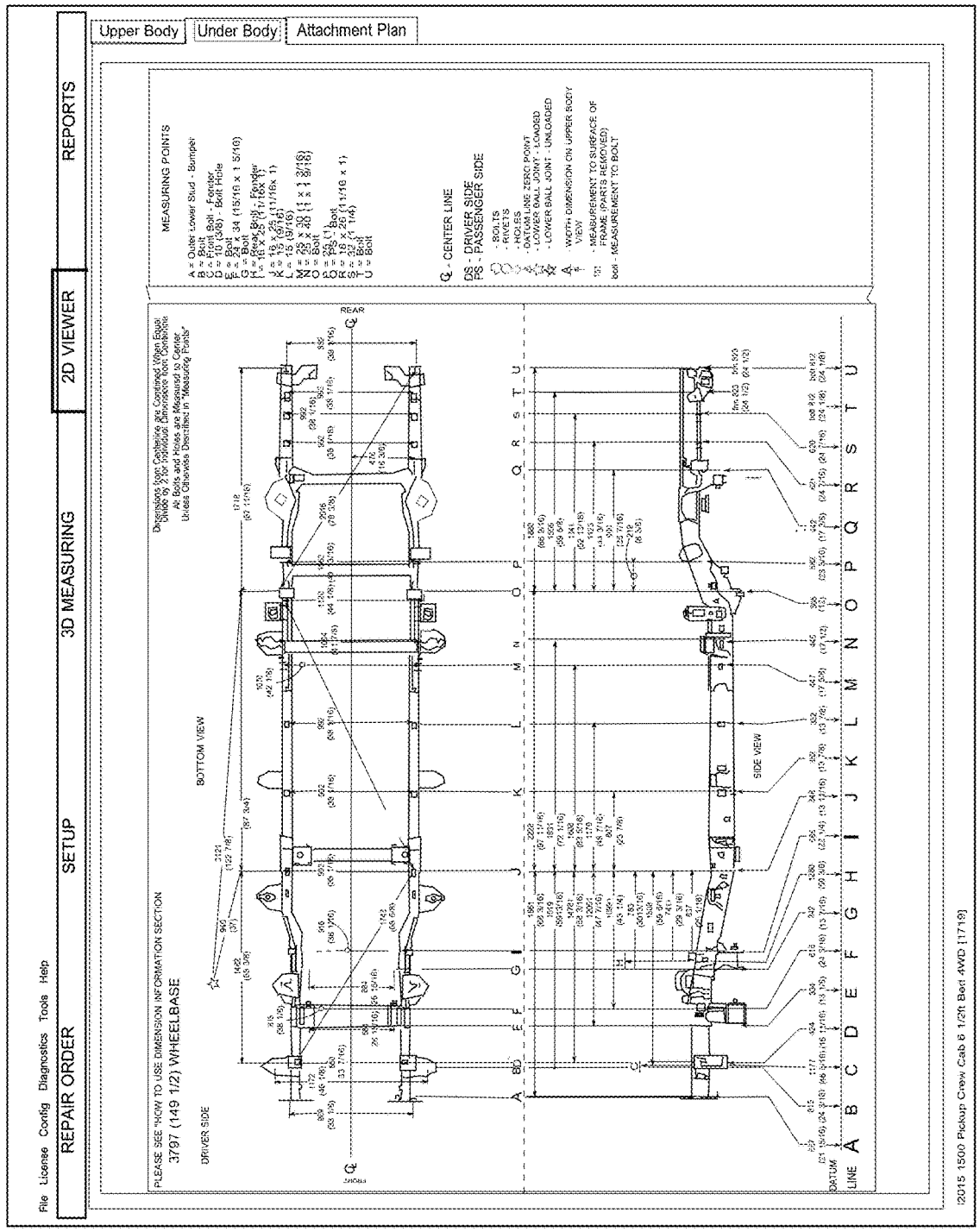
FIG. 17 is a representation of a screen shot of a 2D viewer screen as part of the estimating system of the invention.

Next, the vehicle is scanned by the scanners and then data about the vehicle is generated from the scanner and targets. The software communicates with the scanner and or the targets, polling them for data as they become active. Each target is assigned to a specification point on the as-built data, creating a relationship between the car as-built measurements, and the observed measurements. FIG. 17 is a representation of a screen shot of that display. In this figure. Next, the data is analyzed. The location of 3 targets within view of the scanner allows the scanner coordinate system to be geometrically translated to the vehicle specification points coordinate system. An analysis of those targets' actual position relative to the as-built data can be performed. It is this computation, based on data obtained from hardware, that allows damage to be properly assigned to locations that are out of specifications.

As the analysis is performed, each target can be displayed in its current location in numeric X, Y, Z format, as well as the change (Delta) from the as built X, Y, and Z values. Additionally, a graphic of the frame model can be displayed with colors representing levels of damage and the targets showing displacement from the specification points. This updates as the targets move, so as the technician repairs the car, he can observe, in real-time, the positional status of a given target. In addition, the software can display vectors, which indicate the direction and distance each target needs to move to return it to the as-built specification.

Given this body of information, the repair technician is able to use whatever method is available to repair the damaged frame elements identified. Several features in the software further enable and facilitate this repair; for example, the "snapshot" interface allows the technician to save a screen shot of the current position of all of the targets, as well as the view of the 3D rendering screen. This allows a technician to observe and capture the frame condition before and after the repair efforts, and provides a descriptive graphic for an insurance report.

Figure 18:
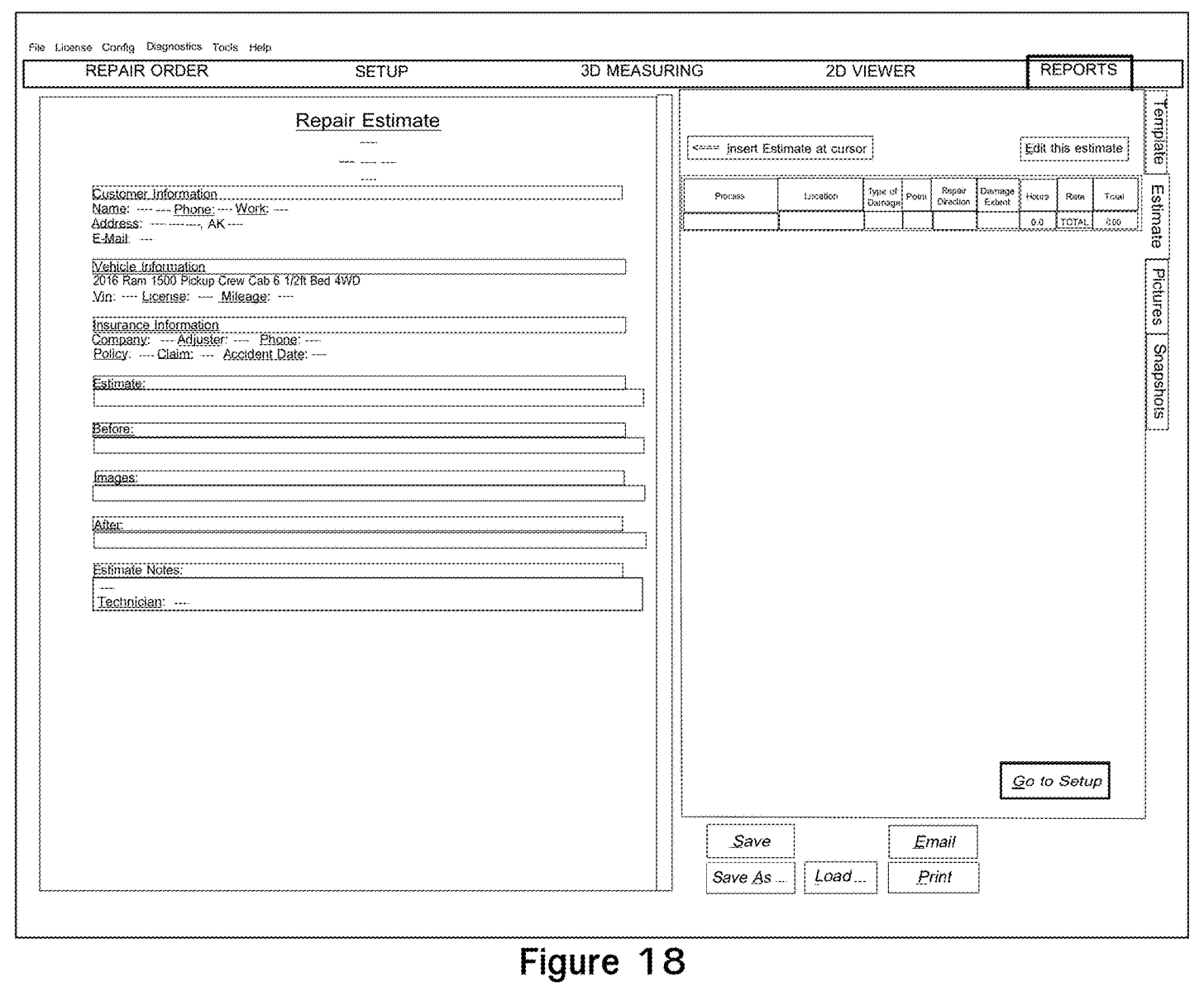

A report can be generated based on this analysis of the cost of repairs. This estimate can be generated from the reports tab, as shown in FIG. 18. Upon completion of the repair process, or at some date after the repair process was completed, the technician reports the repair to an insurance company or to the customer for billing. The invention includes a reporting function, shown in FIG. 18, which includes the ability to display, email or print any or all of the following: information collected in the data entry screen, snapshot views from the measurement screen, as well as zoom-in shots on damaged areas of the frame, annotations by the technician on any of the photos, as well as numerical comparisons of before and after X, Y, and Z positional information for the most damaged spec points in the repair (see the tabs on the right side of the screen).

The system software is implemented using standard coding techniques in any suitable language.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A scanning measurement system comprising:
   a) a laser scanner, said laser scanner having a housing, said housing having a single rotating head, and two parallel laser beams emanating in a horizontal plane, spaced apart and having a set width between said two parallel laser beams;
   b) at least one target positioned in a structure to be scanned, and outside of said housing for said laser scanner;
   c) a transmitter, for transmitting positional data regarding said at least one target, to a computer that includes a software program and having a display screen that displays:
      i) an initial data entry screen for obtaining information related to a specific job;

ii) a set up screen that allows a technician to designate targets on a measurable object displayed on said display screen for analysis;

iii) a screen for the analysis and measurement of a 3-D type of display, showing a position for said at least one target;

iv) a screen for displaying and indicating an amount of deformation detected by said scanner; and v) a screen for the reporting of an estimate for the cost of proposed work or, the results of any repairs done to said measurable object.

2. The scanning measurement system of claim 1 further comprising at least one photo detector installed in said rotating head.

3. The scanning measurement system of claim 1 further comprising a power source installed within said rotating head.

4. The scanning measurement system of claim 1 wherein said power source is selected from the group of: batteries, a connector to an external power source, or a slip ring.

5. The scanning measurement system of claim 1 further comprising a control circuit.

6. The scanning measurement system of claim 5 further comprising a synch pulse generator, installed in said control circuit.

7. The scanning measurement system of claim 2 wherein the at least one photo detector includes:
a) at least one photo diode;
b) at least one Fresnel lens; and
c) at least one mirror.

8. The scanning measurement system of claim 1 wherein said measurable object is a vehicle frame.

9. The scanning measurement system of claim 1 further comprising a means for rotating said rotating head.

10. The scanning measurement system of claim 9 wherein the means for rotating said rotating head comprise a motor.

11. The scanning measurement system of claim 10 wherein the motor is positioned in said housing.

12. The scanning measurement system of claim 1 wherein the transmitter is mounted in said rotating head.

13. The scanning measurement system of claim 1 wherein the two parallel laser beams are produced by a pair of lasers.

14. The scanning measurement system of claim 1 wherein the two parallel laser beams are produced by a single laser and a means for causing two parallel laser beams to emanate from said housing.

15. The scanning measurement system of claim 14 wherein the means for causing two parallel laser beams to emanate from said housing are selected from the group of: beam splitters, mirrors and prisms.

16. A method of examining a measurable object to determine an amount of deviation from a known standard of measurable object using a scanner having a laser scanner, said laser scanner having a housing, said housing having a single rotating head, at least one laser, and a means for causing two parallel laser beams to emanate from said housing, said rotating head also containing a control circuit, and further wherein said two parallel laser beams emanating in a horizontal plane, spaced apart and having a set width between said two parallel laser beams; a motor for rotating said rotating head; at least one target being external of said housing for said laser scanner; and a transmitter, for transmitting positional data regarding said at least one target, from said housing to a computer having a display screen comprising the steps of:

a) placing said measurable object within the range of said laser scanner external to said housing;

b) positioning at least one target on said measurable object; indicating an amount of deformation detected by said scanner; and c) reading the position of said target using said laser scanner by first measuring the position with one of said pair of parallel beams emanating from said laser scanner and then measuring the position of said target with the second of said pair of parallel beams emanating from said laser scanner, thereby developing a set of measurement data, whereby the step of developing a set of measurement data further includes the steps of:

i) developing a radius distance from said scanner at an angle with respect to a base line for the measurement, from the first of said pair of parallel beams emanating from said laser scanner;

ii) developing a radius distance from said scanner at an angle with respect to a base line for the measurement, from the second of said pair of parallel beams emanating from said laser scanner;

iii) calculating the center of the target to develop an average angle $\gamma$ to a target at an average distance R; and iv) resolving said average angle $\gamma$ to the target at an average distance R into x and y components; and d) transmitting said set of measurement data to said computer.

17. The method of claim 16 wherein the step of resolving the angle $\gamma$ to said target at an average distance R into x and y components comprises the steps of:

a) calculating the X component by the equation $X = R * \cos((\Theta_2 + \Theta_1)/2)$;

b) calculating the Y component by the equation $Y = R * \sin((\Theta_2 + \Theta_1)/2)$;

c) wherein the term $\theta_1$ is the angle with respect to a base line for the measurement, from the first of said pair of parallel beams and the term $\theta_2$ is the angle with respect to a base line for the measurement, from the second of said pair of parallel beams.

* * * * *